US012595365B2

(12) United States Patent
Liao et al.

(10) Patent No.: US 12,595,365 B2
(45) Date of Patent: Apr. 7, 2026

(54) RESIN COMPOSITION

(71) Applicant: NAN YA PLASTICS CORPORATION, Taipei (TW)

(72) Inventors: Te-Chao Liao, Taipei (TW); Hung-Yi Chang, Taipei (TW); Chia-Lin Liu, Taipei (TW); Wei-Ru Huang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 489 days.

(21) Appl. No.: 18/182,399

(22) Filed: Mar. 13, 2023

(65) Prior Publication Data

US 2024/0166866 A1 May 23, 2024

(30) Foreign Application Priority Data

Nov. 3, 2022 (TW) ................................ 111141998

(51) Int. Cl.
*C08L 71/00* (2006.01)

(52) U.S. Cl.
CPC ........... *C08L 71/00* (2013.01); *C08L 2201/08* (2013.01)

(58) Field of Classification Search
None
See application file for complete search history.

(56) References Cited

U.S. PATENT DOCUMENTS

| | | | | |
|---|---|---|---|---|
| 2017/0190837 A1* | 7/2017 | Hsieh | .................. | H05K 1/0326 |
| 2022/0204746 A1* | 6/2022 | Ming | ...................... | C08J 5/246 |

FOREIGN PATENT DOCUMENTS

| | | |
|---|---|---|
| CN | 109135193 | 1/2019 |
| CN | 112552630 | 3/2021 |

OTHER PUBLICATIONS

"Office Action of Taiwan Counterpart Application", issued on Aug. 28, 2023, p. 1-p. 7.

* cited by examiner

*Primary Examiner* — Jeffrey D Washville
(74) *Attorney, Agent, or Firm* — JCIPRNET

(57) ABSTRACT

A resin composition is provided. The resin composition includes a resin and an inorganic filler. The resin includes a bismaleimide resin and a polyphenylene ether resin. The inorganic filler includes a first inorganic filler and a second inorganic filler. An average particle size of the first inorganic filler is 0.3 μm to 0.6 μm. An average particle size of the second inorganic filler is 20 μm to 50 μm.

15 Claims, No Drawings

RESIN COMPOSITION

CROSS-REFERENCE TO RELATED APPLICATION

This application claims the priority benefit of Taiwan application serial no. 111141998, filed on Nov. 3, 2022. The entirety of the above-mentioned patent application is hereby incorporated by reference herein and made a part of this specification.

BACKGROUND

Technical Field

The invention relates to a composition, particularly to a resin composition.

Description of Related Art

With the development of the 5th generation mobile networks (5G), the demand for matching electronic products also increases. However, in the pursuit of high-speed transmission and miniaturization of size, high heat will be generated during signal transmission, which will cause the problem of overheating of electronic products. Accordingly, a method is currently necessary to address the issues above.

SUMMARY

The invention provides a resin composition capable of forming a substrate with good thermal conductivity, heat resistance and dielectric properties.

A resin composition of the invention includes a resin and an inorganic filler. The resin includes a bismaleimide resin and a polyphenylene ether resin. The inorganic filler includes a first inorganic filler and a second inorganic filler. An average particle size of the first inorganic filler is 0.3 μm to 0.6 μm. An average particle size of the second inorganic filler is 20 μm to 50 μm.

In an embodiment of the invention, a weight ratio of a usage amount of the first inorganic filler to a usage amount of the second inorganic filler is 1:1 to 1:3.

In an embodiment of the invention, the first inorganic filler is spherical silicon dioxide. The second inorganic filler is spherical boron nitride.

In an embodiment of the invention, the inorganic filler further includes a third inorganic filler. An average particle size of the third inorganic filler is between the average particle size of the first inorganic filler and the average particle size of the second inorganic filler.

In an embodiment of the invention, the inorganic filler further includes a third inorganic filler. An average particle size of the third inorganic filler is 4 μm to 6 μm.

In an embodiment of the invention, a weight ratio of a usage amount of the second inorganic filler to a usage amount of the third inorganic filler is 1:0.3 to 1:2.

In an embodiment of the invention, the third inorganic filler is spherical aluminium silicate.

In an embodiment of the invention, based on a total usage amount of 100 parts by weight of the resin, a usage amount of the inorganic filler is 100 parts by weight to 300 parts by weight.

In an embodiment of the invention, based on a total usage amount of 100 parts by weight of the resin, a usage amount of the bismaleimide resin is 30 parts by weight to 50 parts by weight, a usage amount of the polyphenylene ether resin is 30 parts by weight to 50 parts by weight.

In an embodiment of the invention, the resin further includes a liquid rubber resin, a crosslinking agent or a combination thereof.

In an embodiment of the invention, based on a total usage amount of 100 parts by weight of the resin, a usage amount of the liquid rubber resin is 0 part by weight to 20 parts by weight, a usage amount of the crosslinking agent is 0 part by weight to 20 parts by weight.

In an embodiment of the invention, the resin composition further includes a flame retardant. Based on a total usage amount of 100 parts by weight of the resin, a usage amount of the flame retardant is 5 parts by weight to 80 parts by weight.

In an embodiment of the invention, the resin composition further includes a siloxane coupling agent. Based on a total usage amount of 100 parts by weight of the resin, a usage amount of the siloxane coupling agent is 0.1 parts by weight to 4 parts by weight.

In an embodiment of the invention, the resin composition further includes a catalyst. Based on a total usage amount of 100 parts by weight of the resin, a usage amount of the catalyst is 0.1 parts by weight to 2 parts by weight.

Based on the above, the invention provides a resin composition including a resin and an inorganic filler, wherein the inorganic filler includes a first inorganic filler and a second inorganic filler with different average particle sizes, and each average particle sizes thereof are within a specific range. Thereby, a substrate made of the resin composition may have good thermal conductivity, heat resistance and dielectric properties, and is suitable for 5G high-frequency substrate materials.

To make the features and advantages of the disclosure to be comprehended more easily, embodiments are described in detail as follows.

DESCRIPTION OF THE EMBODIMENTS

The following are embodiments describing the content of the invention in detail. The implementation details provided in the embodiments are for illustrative purposes, and are not intended to limit the scope of protection of the content of the invention. Those with ordinary knowledge in the art may modify or change these implementation details according to the needs of the actual implementation.

Resin Composition

The invention provides a resin composition including a resin and an inorganic filler. In addition, the resin composition of the invention may further include a flame retardant, a siloxane coupling agent, a catalyst or a combination thereof. Hereinafter, the various components above are described in detail.

Resin

The resin includes a bismaleimide (BMI) resin and a polyphenylene ether resin. The bismaleimide resin may use bisphenol A as a main structure, end-capped with maleimide and grafted with an alkyl group having 1 to 5 carbon atoms on the main structure of bisphenol A. Specifically, the structure of the bismaleimide resin may be represented by Formula (1) as follows. However, the invention is not limited thereto.

Formula (1)

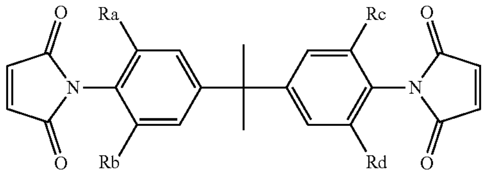

In Formula (1), Ra, Rb, Rc, and Rd each represent an alkyl group having 1 to 5 carbon atoms, preferably an alkyl group having 1 to 3 carbon atoms; more preferably, Ra and Rc each represent a methyl group, while Rb and Rd each represent an ethyl group.

The polyphenylene ether resin may be a thermosetting polyphenylene ether resin and is a composition with terminal groups having styrene-type polyphenylene ether and terminal acrylic-type polyphenylene ether. For example, a structure of the styrene-type polyphenylene ether may be represented by Formula (2) as follows, while a structure of the terminal acrylic-type polyphenylene ether may be represented by Formula (3) as follows.

Formula (2)

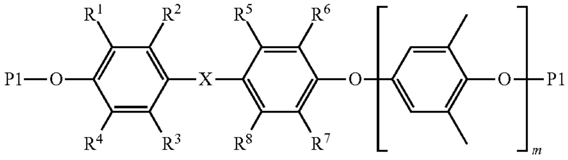

In Formula (2), $R^1$ to $R^8$ may each represent a hydrogen atom, an allyl group, a C1 to C6 alkyl group or a combination thereof, and two of $R^1$ to $R^8$ may be the same or different; X may represent a single bond, an oxygen atom, a propylene group (e.g. $*-C(CH_3)_2-*$), a butylene group (e.g. $*-C(CH_3)(C_2H_5)-*$),

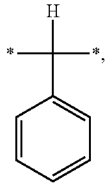

an ethylene group (e.g. $*-CH(CH_3)-*$), a methylene group,

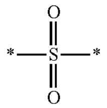

or

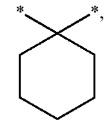

wherein * represents a bonding position; P1 may represent a styryl group

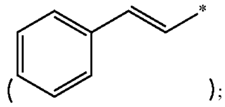

m may represent an integer from 1 to 99.

Formula (3)

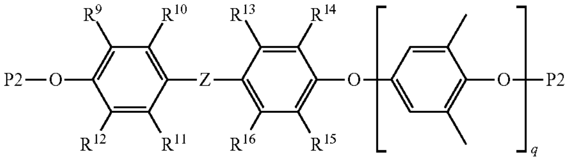

In Formula (3), $R^9$ to $R^{16}$ may each represent a hydrogen atom, an allyl group, a C1 to C6 alkyl group or a combination thereof, and two of $R^9$ to $R^{16}$ may be the same or different; Z may represent a single bond, an oxygen atom, a propylene group (e.g. $*-C(CH_3)_2-*$), a butylene group (e.g. $*-C(CH_3)(C_2H_5)-*$),

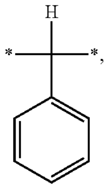

an ethylene group (e.g. $*-CH(CH_3)-*$), a methylene group,

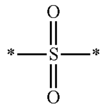

or

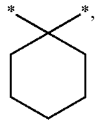

wherein * represents a bonding position; P2 may represent

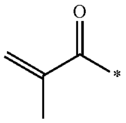

or

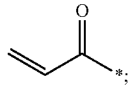

q may represent an integer from 1 to 99.

Specific examples of the polyphenylene ether resin includes bishydroxy polyphenylene ether resin (e.g. SA-90 (trade name), manufactured by Saudi Basic Industries Corporation (SABIC), weight average molecular weight: 2,000), vinyl benzyl polyphenylene ether resin (e.g. OPE-2st (trade name), manufactured by Mitsubishi Gas Chemical Company, weight average molecular weight: 2,200), methacrylate polyphenylene ether resin (e.g. SA-9000 (trade name), manufactured by SABIC, weight average molecular weight: 2,200), vinyl benzyl modified bisphenol A polyphenylene ether resin, vinyl chain-extended polyphenylene ether resin or other suitable polyphenylene ether resins, preferably vinyl polyphenylene ether. A weight average molecular weight of the polyphenylene ether resin may be 1,000 to 4,000, preferably 1,500 to 2,500.

Based on a total usage amount of 100 parts by weight of the resin, a usage amount of the bismaleimide resin is 30 parts by weight to 50 parts by weight (e.g. 30 parts by weight, 35 parts by weight, 40 parts by weight, 45 parts by weight, 50 parts by weight, or any value in a range of 30 parts by weight to 50 parts by weight), preferably 30 parts by weight to 45 parts by weight; a usage amount of the polyphenylene ether resin is 30 parts by weight to 50 parts by weight (e.g. 30 parts by weight, 35 parts by weight, 40 parts by weight, 45 parts by weight, 50 parts by weight, or any value in a range of 30 parts by weight to 50 parts by weight), preferably 40 parts by weight to 50 parts by weight.

In this embodiment, the resin may further include a liquid rubber resin, a crosslinking agent or other suitable components. The liquid rubber resin may include polybutadiene or other suitable liquid rubber resins. The polybutadiene may be represented by Formula (4) as follows.

Formula (4)

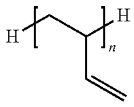

In Formula (4), n represents an integer from 15 to 25, preferably an integer from 16 to 22.

The liquid rubber resin may be polyolefin. For example, the liquid rubber resin may further include styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene copolymer, polybutadiene (homopolymer of butadiene), maleic anhydride-styrene-butadiene copolymer, methyl styrene copolymer or other suitable polyolefins.

The liquid rubber resin may have 10 mol % to 90 mol % 1,2-vinyl and 0 mol % to 50 mol % styrene, and a molecular weight may be 1,000 to 5,000 to effectively crosslink with other resins and improve compatibility. However, the invention is not limited thereto.

The crosslinking agent may be used to increase a degree of crosslinking of thermosetting resin, adjust rigidity and toughness of the substrate, and adjust processability. For example, the crosslinking agent may include 1,3,5-triallyl cyanurate (TAC), triallyl isocyanurate (TAIC; CAS: 1025-15-6), trimethylallyl isocyanurate (TMAIC), diallyl phthalate, divinylbenzene, 1,2,4-triallyl trimellitate or other suitable crosslinking agents. The crosslinking agent may be used alone or in combination.

Based on a total usage amount of 100 parts by weight of the resin, a usage amount of the liquid rubber resin is 0 part by weight to 20 parts by weight (e.g. 0 part by weight, 5 parts by weight, 10 parts by weight, 15 parts by weight, 20 parts by weight, or any value in a range of 0 part by weight to 20 parts by weight), preferably 5 parts by weight to 20 parts by weight; a usage amount of the crosslinking agent is 0 part by weight to 20 parts by weight (e.g. 0 part by weight, 5 parts by weight, 10 parts by weight, 15 parts by weight, 20 parts by weight, or any value in a range of 0 part by weight to 20 parts by weight), preferably 5 parts by weight to 20 parts by weight.

Inorganic Filler

The inorganic filler includes a first inorganic filler and a second inorganic filler. An average particle size ($D_{50}$) of the first inorganic filler is smaller than an average particle size of the second inorganic filler. The average particle size of the first inorganic filler is 0.3 μm to 0.6 μm, preferably 0.4 μm to 0.5 μm; while the average particle size of the second inorganic filler is 20 μm to 50 μm, preferably 30 μm to 50 μm. The first inorganic filler may be spherical silicon dioxide or other suitable inorganic fillers. The second inorganic filler may be spherical boron nitride or other suitable inorganic fillers. A weight ratio of a usage amount of the first inorganic filler to a usage amount of the second inorganic filler may be 1:1 to 1:3, preferably 1:1.5 to 1:2.5.

In this embodiment, the inorganic filler may further include a third inorganic filler. An average particle size of the third inorganic filler is between the average particle size of the first inorganic filler and the average particle size of the second inorganic filler. The average particle size of the third inorganic filler may be 4 μm to 6 μm. The third inorganic filler may be spherical aluminium silicate. A weight ratio of a usage amount of the second inorganic filler to a usage amount of the third inorganic filler may be 1:0.3 to 1:2, preferably 1:0.5 to 1:1.5.

Based on a total usage amount of 100 parts by weight of the resin, a usage amount of the inorganic filler is 100 parts by weight to 300 parts by weight (e.g. 100 parts by weight, 150 parts by weight, 200 parts by weight, 250 parts by weight, 300 parts by weight, or any value in a range of 100 parts by weight to 300 parts by weight), preferably 250 parts by weight to 280 parts by weight.

When the resin composition includes inorganic fillers with different average particle sizes, and each average particle sizes thereof are within a specific range, the arrangement density may be enhanced to improve the thermal conductivity of a substrate made of the resin composition. When the inorganic filler includes inorganic fillers having an average particle size in different specific ranges and is a spherical inorganic filler, it is easier to form stacks compared with irregular inorganic fillers, and may effectively achieve the closest packing, so as to improve the thermal conductivity of a substrate made of the resin composition.

Flame Retardant

The flame retardant is not particularly limited, and suitable flame retardant may be selected according to needs. The flame retardant may include a halogen-free flame retardant or other suitable flame retardants. The flame retardant may include a phosphorus-based flame retardant. For example, the phosphorus-based flame retardant may include phosphate-based flame retardant, phosphazene-based flame retardant, ammonium polyphosphate-based flame retardant, melamine polyphosphate (MPP)-based flame retardant, melamine cyanurate-based flame retardant, DOPO-based flame retardant, aluminum-containing hypophosphite-based flame retardant or other suitable phosphorus-based flame retardants.

The phosphate-based flame retardant may include triphenyl phosphate (TPP), resorcinol bisdiphenylphosphate (RDP; e.g. CR-733S (trade name), manufactured by DAIHACHI CHEMICAL INDUSTRY CO., LTD.), bisphenol-A bis(diphenyl phosphate) (BDP), bisphenol-A bis(dimethyl phosphate) (BBC), resorcinol-bis(di-2,6-dimethylphenyl phosphate) (e.g. PX-200 (trade name), manufactured by DAIHACHI CHEMICAL INDUSTRY CO., LTD.) or other suitable phosphate-based flame retardants.

The phosphazene-based flame retardant may include poly (bis(phenoxy)phosphazene) (e.g. SPB-100 (trade name), manufactured by Otsuka Chemical Co., Ltd.) or other suitable phosphazene-based flame retardants. The DOPO-based flame retardant may include DOPO represented by Formula (5) as follows, DOPO-HQ represented by Formula (6) as follows, double DOPO derivative structure represented by Formula (7) as follows or other suitable DOPO-based flame retardants.

The aluminum-containing hypophosphite-based flame retardant may include a compound represented by Formula (8) as follows or other suitable aluminum-containing hypophosphite-based flame retardants.

Formula (5)

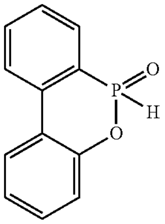

Formula (6)

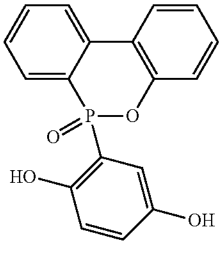

Formula (7)

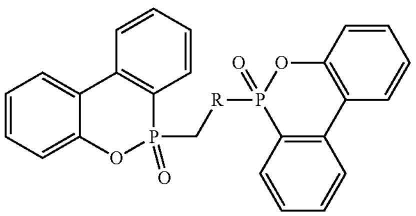

In Formula (7), R may represent *—(CH2)r-*,

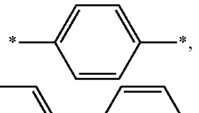

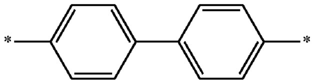

or

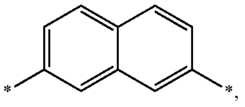

wherein r may represent an integer from 1 to 4, and * represents a bonding position.

Formula (8)

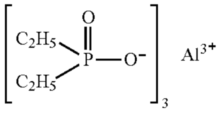

Based on a total usage amount of 100 parts by weight of the resin, a usage amount of the flame retardant is 5 parts by weight to 80 parts by weight (e.g. 5 parts by weight, 10 parts by weight, 20 parts by weight, 40 parts by weight, 60 parts by weight, 80 parts by weight, or any value in a range of 5 parts by weight to 80 parts by weight), preferably 15 parts by weight to 45 parts by weight.

Siloxane Coupling Agent

The siloxane coupling agent is not particularly limited, and suitable siloxane coupling agent may be selected according to needs. The siloxane coupling agent may include siloxane compound or other suitable siloxane coupling agents. According to the type of functional groups, the siloxane coupling agent may be divided into, for example, amino silane, epoxide silane, vinyl silane, ester silane, hydroxy silane, isocyanate silane, methylacryloxy silane and acryloxy silane.

Based on a total usage amount of 100 parts by weight of the resin, a usage amount of the siloxane coupling agent is 0.1 parts by weight to 4 parts by weight (e.g. 0.1 parts by weight, 0.5 parts by weight, 1.0 parts by weight, 1.5 parts by weight, 2.0 parts by weight, 2.5 parts by weight, 3.0 parts by weight, 3.5 parts by weight, 4.0 parts by weight, or any value in a range of 0.1 parts by weight to 4 parts by weight), preferably 0.5 parts by weight to 2.5 parts by weight.

Catalyst

The catalyst is not particularly limited, and suitable catalyst may be selected according to needs. The catalyst may include 2-phenyl-1H-imidazole-1-propiononitrile (2PZCN; CAS: 23996-12-5), 1-benzyl-2-phenylimidazole (1B2PZ; CAS: 37734-89-7), thiabendazole (TBZ; CAS: 7724-48-3), tert-butyl cumyl peroxide, dicumyl peroxide (DCP), benzoyl peroxide (BPO), 2,5-dimethyl-2,5-di(tert-butylperoxy) hexane, 2,5-dimethyl-2,5-di(tert-butylperoxy)hexyne, 1,1-di-(tert-butylperoxy)-3,3,5-trimethylcyclohexane, di(tert-butylperoxyisopropyl) benzene, Luperox F (trade name; manufactured by ARKEMA Corporation) or other suitable catalysts, preferably Luperox F (trade name). The catalyst may be used alone or in combination.

Based on a total usage amount of 100 parts by weight of the resin, a usage amount of the catalyst is 0.1 parts by weight to 2 parts by weight (e.g. 0.1 parts by weight, 0.5 parts by weight, 1.0 parts by weight, 1.5 parts by weight, 2.0 parts by weight, or any value in a range of 0.1 parts by weight to 2 parts by weight), preferably 0.5 parts by weight to 1 part by weight.

Preparation Method of Resin Composition

The preparation method of the resin composition is not particularly limited. For example, each components of the resin composition were placed in a stirrer and stirred to be uniformly mixed into a solution state. If needed, a solvent may also be added. After mixing uniformly, a resin composition was obtained.

Hereinafter, the invention is described in detail with reference to examples. The following examples are provided to describe the invention, and the scope of the invention includes the scope in the following patent application and its substitutes and modifications, and is not limited to the scope of the examples.

EXAMPLES OF RESIN COMPOSITION

Example 1 to Example 2 and Comparative Example 1 to Comparative Example 4 of the resin composition are described below:

Example 1 to Example 2 and Comparative Example 1 to Comparative Example 4

According to Table 1 and Table 2, the resin compositions of each experimental example were mixed with toluene to form a varnish of a thermosetting resin composition. The varnish was impregnated with NAN YA fiberglass cloth (manufactured by NAN YA PLASTICS CORPORATION, cloth type: 2013) at room temperature. Then, after drying at 130° C. (impregnator) for several minutes, a prepreg with a resin content of 60 wt % was obtained. Finally, 4 pieces of prepreg were stacked layer by layer between two pieces of 35 μm thick copper foil, at the pressure of 25 kg/$cm^2$ and the temperature of 85° C., and kept the constant temperature for 20 minutes; then heated at 3° C./min until 185° C., and kept the constant temperature for 120 minutes. Next, after cooling slowly to 130° C., a 0.5 mm thick copper foil substrate was obtained. The prepared copper foil substrate was evaluated by each of the following evaluation methods, and the results thereof are as shown in Table 2.

TABLE 1

| | Symbol | Components/compound |
|---|---|---|
| Bismaleimide resin | BMI-5100 | Trade name, manufactured by DAIWA KASEI KOGYO, CO., LTD.. |
| Polyphenylene ether resin | SA-9000 | Trade name, manufactured by SABIC. |

TABLE 1-continued

| | Symbol | Components/compound |
|---|---|---|
| Liquid rubber resin | RI-150 | Trade name of polybutadiene, manufactured by Cray Valley. |
| | RI-257 | Trade name of polybutadiene, manufactured by Cray Valley. |
| Crosslinking agent | TAIC | Triallyl isocyanurate |
| Spherical silicon dioxide | SC2500 | Trade name, manufactured by Admatechs CO., LTD.. An average particle size is 0.5 μm. |
| | SS15V | Trade name, manufactured by SIBELCO Company. An average particle size is 2 μm to 3 μm. |
| Spherical boron nitride | SA35 | Trade name, manufactured by SAINT-GOBAIN ADVANCED MATERIALS CO., LTD.. An average particle size is 40 μm to 50 μm. |
| | PTX-25 | Trade name, manufactured by Momentive Performance Materials Inc.. An average particle size is 40 μm to 50 μm. |
| Spherical aluminium silicate | 1466-600VST | Trade name, manufactured by Quarzwerke GMBH. An average particle size is 4 μm to 6 μm. |
| Spherical aluminium oxide | S03 | Trade name, manufactured by FORCE APPLIED MATERIAL TECHNOLOGY COMPANY. An average particle size is 3 μm. |
| | S10 | Trade name, manufactured by FORCE APPLIED MATERIAL TECHNOLOGY COMPANY. An average particle size is 10 μm. |
| Flame retardant | OP-935 | Trade name, manufactured by Clariant Corporation. |
| | PX-200 | Trade name, manufactured by DAIHACHI CHEMICAL INDUSTRY CO., LTD.. |
| Siloxane coupling agent | Z6030 | Trade name, manufactured by Dow Corning Inc.. |
| Catalyst | Luperox F | Trade name; manufactured by ARKEMA Corporation. |

TABLE 2

| Component | | Examples | | Comparative examples | | | |
|---|---|---|---|---|---|---|---|
| (unit: parts by weight) | | 1 | 2 | 1 | 2 | 3 | 4 |
| Bismaleimide resin | BMI-5100 | 30 | 37.5 | 30 | 37.5 | 37.5 | 37.5 |
| Polyphenylene ether resin | MX9000 | 50 | 42.5 | 50 | 42.5 | 42.5 | 42.5 |
| Liquid rubber resin | RI-150 | 10 | — | 10 | — | — | — |
| | RI-257 | — | 10 | — | 10 | 10 | 10 |
| Crosslinking agent | TAIC | 10 | 10 | 10 | 10 | 10 | 10 |
| Spherical silicon dioxide | SC2500 | 54 | 54 | — | — | — | — |
| | SS15V | — | — | 43 | — | — | — |
| Spherical boron nitride | SA35 | 108 | 108 | — | — | — | — |
| | PTX-25 | — | — | 72 | 28 | 34 | 40 |
| Spherical aluminium silicate | 1466-600VST | 108 | 108 | 86 | — | — | — |
| Spherical aluminium oxide | S03 | — | — | — | 30 | 30 | 30 |
| | S10 | — | — | — | 90 | 90 | 90 |
| Flame retardant | OP-935 | 16 | | 16 | | | |
| | PX-200 | | 16 | | 16 | 16 | 16 |
| Siloxane coupling agent | Z6030 | 2.7 | 2.0 | 2.7 | 2.0 | 2.0 | 2.0 |
| Catalyst | Luperox F | 0.8 | 0.5 | 0.8 | 0.5 | 0.5 | 0.5 |
| Evaluation results | Heat resistance | ○ | ○ | X | X | X | X |
| | Thermal conductivity coefficient (unit: W/mk) | 1.28 | 1.25 | 1.21 | 1.01 | 1.12 | 1.26 |

TABLE 2-continued

| Component | Examples | | Comparative examples | | | |
|---|---|---|---|---|---|---|
| (unit: parts by weight) | 1 | 2 | 1 | 2 | 3 | 4 |
| Tg (unit: ° C.) | 250 | 234 | 223 | 230 | 210 | 225 |
| Dielectric constant (Dk) | 3.74 | 3.70 | 3.74 | 4.10 | 4.14 | 3.83 |
| Dissipation factor (Df) | 0.0026 | 0.0030 | 0.0034 | 0.0039 | 0.0039 | 0.0035 |
| Peel strength (unit: lb/in) | 6.15 | 4.50 | 2.61 | 3.73 | 3.73 | 2.98 |

Evaluation Methods a. Heat Resistance

After heating the sample at 120° C. and 2 atm in a pressure cooker for 120 minutes, it was immersed in a 288° C. solder furnace, and the time required for the sample to burst and delaminate was recorded to test the solder heat resistance of the sample at a temperature of 288° C.

The evaluation criteria of heat resistance are as follows:

○: 600 seconds≤the time required for the sample to burst and delaminate;

X: the time required for the sample to burst and delaminate<600 seconds.

b. Thermal Conductivity Coefficient

The sample was measured for a thermal conductivity coefficient via an interface material thermal resistance and thermal conductivity measuring instrument (model: LW-9389; manufactured by LONG WIN SCIENCE & TECHNOLOGY CORPORATION) according to the ASTM D5470 standard. When the thermal conductivity coefficient is greater, the resin composition has good thermal conductivity.

c. Glass Transition Temperature (Tg)

The sample was measured for a glass transition temperature (Tg) via a dynamic mechanical analyzer (DMA). When the Tg is greater, the resin composition has good resistance to phase changes, that is, good heat resistance.

Heating rate: 10° C./min

Temperature range: 25° C. to 300° C. (heating, cooling, heating)

d. Dielectric Constant (Dk)

The sample was measured for a dielectric constant (Dk) at a frequency of 10 GHz via a dielectric analyzer (model: E4991A; manufactured by Agilent Technologies, Inc.). When the dielectric constant is smaller, the resin composition has good dielectric property.

e. Dissipation Factor (Df)

The sample was measured for a dissipation factor (Df) at a frequency of 10 GHz via a dielectric analyzer (model: E4991A; manufactured by Agilent Technologies, Inc.). When the dissipation factor is smaller, the resin composition has good dielectric property.

f. Peel Strength

A peel strength between the copper foil and the circuit board was measured via a tensile testing machine. When the peel strength is greater, the resin composition has good resistance to peeling from the substrate, that is, good peel resistance.

Evaluation Results

It may be seen from Table 2 that when the resin composition includes inorganic fillers with different average particle sizes, and each average particle sizes are within a specific range (Examples 1~2), the resin composition can maintain the favorable electrical performance and heat resistance of the substrate made of the resin composition and enhance the thermal conductivity coefficient at the same time, that is, the resin composition has good thermal conductivity, heat resistance and dielectric properties at the same time, wherein the dielectric properties are, for example, a dielectric constant (Dk) of 3.70 to 3.75, and a dissipation factor (Df) of 0.0025 to 0.0030.

In addition, compared to the resin composition for which the average particle size of the first inorganic filler is not within the range of 0.3 μm to 0.6 μm (Comparative example 1), the resin compositions for which the average particle size of the first inorganic filler is in the range of 0.3 μm to 0.6 μm (Examples 1~2) have good heat resistance, greater thermal conductivity coefficient, greater glass transition temperature, smaller dissipation factor and greater peel strength, that is, better heat resistance, thermal conductivity, dielectric properties and peel resistance.

In addition, compared to the resin composition using spherical aluminium oxide (Comparative examples 2~4), the resin compositions using spherical silicon dioxide (Examples 1~2) have good heat resistance, greater glass transition temperature, smaller dielectric constant, smaller dissipation factor and greater peel strength, that is, better heat resistance, dielectric properties and peel resistance, and have good thermal conductivity at the same time.

Based on the above, the resin composition of the invention includes a resin and an inorganic filler, and the inorganic filler includes a first inorganic filler with 0.3 μm to 0.6 μm of average particle size and a second inorganic filler with 20 μm to 50 μm of average particle size, so a substrate made of the resin composition has good heat resistance, thermal conductivity, dielectric properties and peel resistance. Therefore, the resin composition has good applicability.

Although the invention has been disclosed in the embodiments above, they are not intended to limit the invention. Anyone with ordinary knowledge in the relevant technical field can make changes and modifications without departing from the spirit and scope of the invention. The scope of protection of the invention shall be subject to those defined by the claims attached.

What is claimed is:

1. A resin composition, comprising:

a resin comprising a bismaleimide resin and a polyphenylene ether resin; and an inorganic filler comprising a first inorganic filler and a second inorganic filler, wherein an average particle size of the first inorganic filler is 0.3 μm to 0.6 μm, an average particle size of the second inorganic filler is 20 μm to 50 μm, wherein a weight ratio of a usage amount of the first inorganic filler to a usage amount of the second inorganic filler is 1:1 to 1:3.

2. The resin composition according to claim 1, wherein the first inorganic filler is spherical silicon dioxide, the second inorganic filler is spherical boron nitride.

3. The resin composition according to claim 1, wherein the inorganic filler further includes a third inorganic filler, an average particle size of the third inorganic filler is between the average particle size of the first inorganic filler and the average particle size of the second inorganic filler.

4. The resin composition according to claim 1, wherein the inorganic filler further includes a third inorganic filler, an average particle size of the third inorganic filler is 4 μm to 6 μm.

5. The resin composition according to claim 3, wherein a weight ratio of a usage amount of the second inorganic filler to a usage amount of the third inorganic filler is 1:0.3 to 1:2.

6. The resin composition according to claim 3, wherein the third inorganic filler is spherical aluminium silicate.

7. The resin composition according to claim 1, wherein based on a total usage amount of 100 parts by weight of the resin, a usage amount of the inorganic filler is 100 parts by weight to 300 parts by weight.

8. The resin composition according to claim 1, wherein based on a total usage amount of 100 parts by weight of the resin, a usage amount of the bismaleimide resin is 30 parts by weight to 50 parts by weight, a usage amount of the polyphenylene ether resin is 30 parts by weight to 50 parts by weight.

9. The resin composition according to claim 1, wherein the resin further comprises a liquid rubber resin, a crosslinking agent or a combination thereof.

10. The resin composition according to claim 9, wherein based on a total usage amount of 100 parts by weight of the resin, a usage amount of the liquid rubber resin is 0 part by weight to 20 parts by weight, a usage amount of the crosslinking agent is 0 part by weight to 20 parts by weight.

11. The resin composition according to claim 1, further comprising a flame retardant, wherein based on a total usage amount of 100 parts by weight of the resin, a usage amount of the flame retardant is 5 parts by weight to 80 parts by weight.

12. The resin composition according to claim 1, further comprising a siloxane coupling agent, wherein based on a total usage amount of 100 parts by weight of the resin, a usage amount of the siloxane coupling agent is 0.1 parts by weight to 4 parts by weight.

13. The resin composition according to claim 1, wherein further comprising a catalyst, wherein based on a total usage amount of 100 parts by weight of the resin, a usage amount of the catalyst is 0.1 parts by weight to 2 parts by weight.

14. The resin composition according to claim 4, wherein a weight ratio of a usage amount of the second inorganic filler to a usage amount of the third inorganic filler is 1:0.3 to 1:2.

15. The resin composition according to claim 4, wherein the third inorganic filler is spherical aluminium silicate.

* * * * *